US012577110B2

(12) United States Patent
Tulodziecki et al.

(10) Patent No.: US 12,577,110 B2
(45) Date of Patent: Mar. 17, 2026

(54) POWDER OF CARBONACEOUS MATRIX PARTICLES AND A COMPOSITE POWDER, FOR USE IN THE NEGATIVE ELECTRODE OF A BATTERY, COMPRISING SUCH A POWDER

(71) Applicants: UMICORE, Brussels (BE); UMICORE KOREA LTD., Chungcheongnam-do (KR)

(72) Inventors: Michal Tulodziecki, Olen (BE); Jean-Sébastien Bridel, Olen (BE); Sul-Hee Min, Chungcheongnam-do (KR)

(73) Assignees: UMICORE, Brussels (BE); UMICORE KOREA LTD., Chungcheongnam-do (KR)

( * ) Notice: Subject to any disclaimer, the term of this patent is extended or adjusted under 35 U.S.C. 154(b) by 538 days.

(21) Appl. No.: 18/030,295

(22) PCT Filed: Oct. 6, 2021

(86) PCT No.: PCT/EP2021/077500
§ 371 (c)(1),
(2) Date: Apr. 5, 2023

(87) PCT Pub. No.: WO2022/074031
PCT Pub. Date: Apr. 14, 2022

(65) Prior Publication Data
US 2024/0010495 A1      Jan. 11, 2024

Related U.S. Application Data

(60) Provisional application No. 63/089,099, filed on Oct. 8, 2020.

(30) Foreign Application Priority Data

Nov. 18, 2020    (EP) .................................... 20208421

(51) Int. Cl.
*C01B 32/05*          (2017.01)

(52) U.S. Cl.
CPC .......... *C01B 32/05* (2017.08); *C01P 2002/08* (2013.01); *C01P 2004/51* (2013.01); *C01P 2006/12* (2013.01); *C01P 2006/90* (2013.01)

(58) Field of Classification Search
CPC .. C01B 32/05; C01P 2002/08; C01P 2004/51; C01P 2006/12; C01P 2006/90
USPC ..... 429/231.8; 148/30; 252/502, 503, 521.3; 428/304.4, 306.6, 307.3, 402, 446; 419/11, 23, 66
See application file for complete search history.

(56) References Cited

U.S. PATENT DOCUMENTS

| | | | | |
|---|---|---|---|---|
| 4,846,673 | A | * | 7/1989 | Tsukada ................ C04B 35/565 |
| | | | | 432/5 |
| 4,894,286 | A | * | 1/1990 | Gray ..................... C04B 41/009 |
| | | | | 428/704 |
| 5,511,603 | A | * | 4/1996 | Brown .................. C22C 1/1036 |
| | | | | 164/97 |
| 12,424,612 | B2 | * | 9/2025 | Moeremans .......... H01M 4/131 |
| 2005/0186104 | A1 | * | 8/2005 | Kear .................... C04B 35/5611 |
| | | | | 419/11 |
| 2009/0029256 | A1 | * | 1/2009 | Mah ..................... H01M 4/1395 |
| | | | | 252/503 |
| 2012/0156493 | A1 | * | 6/2012 | Maisels ................. H01M 4/386 |
| | | | | 252/502 |
| 2015/0218676 | A1 | * | 8/2015 | Nakamura ................ C22C 5/06 |
| | | | | 75/243 |
| 2016/0365567 | A1 | | 12/2016 | Troegel et al. |
| 2018/0269483 | A1 | | 9/2018 | Cho |
| 2020/0020935 | A1 | | 1/2020 | Costantino et al. |
| 2020/0350563 | A1 | | 11/2020 | Uchiyama et al. |
| 2023/0327087 | A1 | | 10/2023 | Costantino et al. |

FOREIGN PATENT DOCUMENTS

| | | | | | |
|---|---|---|---|---|---|
| CN | 104529468 | A | * | 4/2015 | ............. C04B 35/58 |
| CN | 109851375 | A | * | 6/2019 | ............. C04B 35/58 |
| EP | 2600446 | A1 | | 6/2013 | |
| JP | 2015095301 | A | | 5/2015 | |
| JP | 2017506413 | A | | 3/2017 | |
| JP | 2020514231 | A | | 5/2020 | |
| WO | WO-02068373 | A2 | * | 9/2002 | ........... F41H 5/0414 |
| WO | 2016061216 | A1 | | 4/2016 | |
| WO | 2017040299 | A1 | | 3/2017 | |
| WO | 2019130787 | A1 | | 7/2019 | |

(Continued)

OTHER PUBLICATIONS

ISA/EP; International Search Report and Written Opinion for International Patent Application No. PCT/EP2021/077500 dated Jan. 4, 2022, 13 pages.
"A Basic Guide to Particle Characterization", Malvern Instruments Worldwide—White Paper, May 2, 2012, pp. 1-26.
Chen, Tao, et al., "Low-Temperature Treated Lignin as Both Binder and Conductive Additive for Silicon Nanoparticle Composite Electrodes in Lithium-Ion Batteries", ACS Applied Materials & Interfaces, vol. 8, No. 47, Nov. 17, 2016, 8 pages.
JPO: Notice of Reasons for Rejection for corresponding Japanese Patent Application No. 2023-520218, mailed Jun. 3, 2024.

*Primary Examiner* — Patricia L. Hailey
(74) *Attorney, Agent, or Firm* — Rimon P.C.; Allyn B. Elliott

(57) ABSTRACT

A powder of carbonaceous matrix particles with silicon-based sub-particles dispersed therein, wherein the particles have a harmonic mean value of their average Vickers hardness value and their average elastic modulus value, both values of hardness and elasticity being measured by nanoindentation and expressed in MPa, being superior or equal to 7000 MPa and inferior or equal to 20000 MPa.

16 Claims, No Drawings

(56) References Cited

FOREIGN PATENT DOCUMENTS

WO          2019137797  A1     7/2019

* cited by examiner

POWDER OF CARBONACEOUS MATRIX PARTICLES AND A COMPOSITE POWDER, FOR USE IN THE NEGATIVE ELECTRODE OF A BATTERY, COMPRISING SUCH A POWDER

CROSS-REFERENCE TO RELATED APPLICATIONS

This application is a U.S. National Stage application of International Patent Application No. PCT/EP2021/077500, filed on Oct. 6, 2021, which claims the benefit of European Patent Application No. 20208421.6, filed on Nov. 18, 2020, and the benefit of U.S. Provisional Patent Application No. 63/089,099, filed on Oct. 8, 2020.

TECHNICAL FIELD AND BACKGROUND

The present invention relates to a powder of carbonaceous matrix particles, to a composite powder comprising such a powder, to the use of such a composite powder in the negative electrode of a battery and to a battery comprising such a negative electrode.

Lithium ion (Li-ion) batteries are currently the best performing batteries and already became the standard for portable electronic devices. In addition, these batteries already penetrated and rapidly gain ground in other industries such as automotive and electrical storage. Enabling advantages of such batteries are a high-energy density combined with a good power performance.

A Li-ion battery typically contains a number of so-called Li-ion cells, which in turn contain a positive electrode, also called cathode, a negative electrode, also called anode, and a separator which are immersed in an electrolyte. The most frequently used Li-ion cells for portable applications are developed using electrochemically active materials such as lithium cobalt oxide or lithium nickel manganese cobalt oxide for the cathode and a natural or artificial graphite for the anode.

It is known that one of the important limitative factors influencing a battery's performance and in particular a battery's energy density is the active material in the anode. Therefore, to improve the energy density, the use of electrochemically active materials comprising silicon, in the negative electrode, has been investigated over the past years.

In the art, the performance of a battery containing Si-based electrochemically active powders is generally quantified by a so-called cycle life of a full-cell, which is defined as the number of times or cycles that a cell comprising such material can be charged and discharged until it reaches 80% of its initial discharge capacity. Most works on silicon-based electrochemically active powders are therefore focused on improving said cycle life.

A drawback of using a silicon-based electrochemically active material in an anode is its large volume expansion during charging, which is as high as 300% when the lithium ions are fully incorporated, e.g. by alloying or insertion, in the anode's active material—a process often called lithiation. The large volume expansion of the silicon-based materials during lithium incorporation may induce stresses in the silicon-based particles, which in turn could lead to a mechanical degradation of the silicon material. Repeated periodically during charging and discharging of the Li-ion battery, the repetitive mechanical degradation of the silicon-based electrochemically active material may reduce the life of a battery to an unacceptable level.

Further, a negative effect associated with silicon is that a thick SEI, a Solid-Electrolyte Interface, may be formed on the anode. A SEI is a complex reaction product of the electrolyte and lithium, which leads to a loss of lithium availability for electrochemical reactions and therefore to a poor cycle performance, which is the capacity loss per charging-discharging cycle. A thick SEI may further increase the electrical resistance of a battery and thereby limit its ability to charge and discharge at high currents.

In principle, the SEI formation is a self-terminating process that stops as soon as a 'passivation layer' has formed on the surface of the silicon-based material. However, because of the volume expansion of silicon-based particles, both silicon-based particles and the SEI may be damaged during discharging (lithiation) and recharging (de-lithiation), thereby freeing new silicon surface and leading to a new onset of SEI formation.

To solve the above-mentioned drawbacks, composite powders are usually used. In these composite powders, nano-sized silicon-based particles are mixed with at least one component suitable to protect the silicon-based particles from electrolyte decomposition and to accommodate volume changes. Such a component may be a carbon-based material, preferably forming a matrix.

The composite powders usually additionally contain graphitic particles, to adjust their specific capacity to a practical level, between 500 mAh/g and 1500 mAh/g.

Such composite powders are mentioned, for example, in EP 2600446, wherein a powder comprising silicon and a metal alloy matrix is disclosed. In US 2018/0269483, a prelithiated silicon-containing material comprising a silicon core particle and a lithium coating layer, is disclosed. In WO 2016/061216, a composite powder comprising silicon disposed within the pores of an electrically conductive scaffolding matrix, is disclosed. In WO 2017/040299, a composite powder comprising silicon deposited into the pore volume of a porous scaffold material, is disclosed. In WO 2019/137797, a composite powder comprising composite particles having a size-dependent silicon content over at least part of the size range from d10 to d90, is disclosed.

Despite the use of such composite powders, there is still room for improvement of the performance of batteries containing Si-based electrochemically active powders. In particular, the existing composite powders do not allow achieving both a high capacity and a long cycle life, which is essential, in particular for the batteries of the electric vehicles.

It is an object of the present invention to provide a stable electrochemically active powder comprising carbonaceous matrix material particles with silicon-based sub-particles dispersed therein, powder which once used in the negative electrode in the Li-ion battery, is advantageous in that it allows achieving a high capacity combined to a long cycle life.

SUMMARY OF THE INVENTION

This objective is achieved by providing a powder according to Embodiment 1, said powder, which once incorporated into a composite powder for use in a negative electrode of a battery according to Embodiment 4, allows achieving a high capacity combined to a long cycle life, as demonstrated in Examples 1 to 5 compared to Counter examples 1 to 3.

The present invention concerns the following embodiments:

Embodiment 1

In a first aspect, the invention concerns a powder of carbonaceous matrix material particles, said particles comprising silicon-based sub-particles dispersed therein, said particles having a harmonic mean value HM calculated according to the formula (1), $$HM = \frac{2 \times H \times E}{H + E} \qquad (1)$$

wherein H is the average Vickers hardness value of the particles of carbonaceous matrix material and E is the average elastic modulus value of the particles of carbonaceous matrix material, both values H and E being measured by nanoindentation and expressed in MPa, said powder being characterized in that HM is superior or equal to 7000 MPa and inferior or equal to 20000 MPa. Preferably, HM is superior or equal to 7500 MPa and inferior or equal to 18540 MPa. More preferably, HM is superior or equal to 8000 MPa and inferior or equal to 17060 MPa By "a powder of carbonaceous matrix material particles with silicon-based sub-particles dispersed therein", it is meant that the particles of carbonaceous particles are, in average, larger in size than the silicon-based sub-particles, since they comprise these latter. The carbonaceous matrix material particles are typically of micrometric size, while the silicon-based sub-particles are typically of nanometric size.

By "silicon-based sub-particles dispersed in a matrix material", it is meant that the silicon-based sub-particles either form agglomerates of a size smaller than 1 μm or do not for agglomerates at all, and are covered in their majority, preferably in their entirety, by the matrix material. Hence, in the powder according to Embodiment 1, the silicon-based sub-particles are preferably in contact only with each other and/or with the matrix material.

The silicon-based sub-particles may have any shape, e.g. substantially spherical but also irregularly shaped, rod-shaped, plate-shaped, etc. In the silicon-based sub-particles, the silicon is present in its majority as silicon metal, to which minor amounts of other elements may have been added to improve properties, or which may contain some impurities, such as oxygen or traces of metals. When considering all elements except oxygen, the average silicon content in such a silicon-based sub-particle is preferably 80 weight % or more, and more preferably 90 weight % or more with respect to the total weight of the silicon-based sub-particle.

For the purpose of illustrating, in a non-limitative way, the determination of the average Vickers hardness value H and the average elastic modulus value E of the particles of carbonaceous matrix material of a powder according to Embodiment 1, as well as the calculation of the resulting harmonic mean value HM, a procedure based on nanoindentation is provided below.

1. The powder to be analyzed is first embedded in a resin to obtain a sample, the surface of said sample further being polished to obtain a sample with a polished surface.

2. The obtained sample with a polished surface is then analyzed by nanoindentation; several areas comprising particles are visualized. In each of them, the contrast and brightness settings are adjusted for an easy visualization of the particles of carbonaceous matrix material with silicon-based sub-particles dispersed therein. Due to their different chemical composition, the difference in brightness allows for an easy distinction between the particles and the sub-particles.

3. Depending on the size of the particles, one or several indents are performed on several particles of carbonaceous matrix material with silicon-based sub-particles dispersed therein.

4. In total, at least 100 indents are performed on at least 10 different particles of carbonaceous matrix material with silicon-based sub-particles dispersed therein.

5. For each indent, the Vickers hardness value and elastic modulus value are determined, then the average Vickers hardness value and the average elastic modulus value of each of the at least 10 different particles, are calculated.

6. Finally, the harmonic mean value HM is calculated according to the following formula:

$$HM = \frac{2 \times H \times E}{H + E}$$

wherein H is the average Vickers hardness value of the at least 10 different particles of carbonaceous matrix material with silicon-based sub-particles dispersed therein comprised in the powder and E is the average elastic modulus value of the at least 10 different particles of carbonaceous matrix material with silicon-based sub-particles dispersed therein comprised in the powder.

The hardness value in Embodiment 1 corresponds to the Vickers hardness, however it can be readily converted to any other type of hardness via well-known mathematical formulas.

Embodiment 2

In a second embodiment according to Embodiment 1, the particles of carbonaceous matrix material have an average Vickers hardness value H of at least 4000 MPa and at most 12000 MPa and an average elastic modulus value E of at least $28 \times 10^3$ MPa and at most $60 \times 10^3$ MPa. Preferably, the particles of carbonaceous matrix material have an average Vickers hardness value H of at least 4000 MPa and at most 11000 MPa and an average elastic modulus value E of at least $28 \times 10^3$ MPa and at most $59 \times 10^3$ MPa. More preferably, the particles of carbonaceous matrix material have an average Vickers hardness value H of at least 4000 MPa and at most 10000 MPa and an average elastic modulus value E of at least $28 \times 10^3$ MPa and at most $58 \times 10^3$ MPa.

Embodiment 3

In a third embodiment according to Embodiments 1 or 2, the powder has a silicon content S expressed in weight percent (wt %), wherein 20 wt %≤S≤70 wt %. In other words, the particles of carbonaceous matrix material with silicon-based sub-particles dispersed therein have, in average, a silicon content S, with 20 wt %≤S≤70 wt %. Preferably the silicon content S is higher than or equal to 25 wt % and lower than or equal to 60 wt %, more preferably the silicon content S is higher than or equal to 30 wt % and lower than or equal to 50 wt %.

A powder with a too low silicon content would lead to a too low specific capacity and would therefore not allow the battery to reach a high energy density. Furthermore, the silicon sub-particles having a significant contribution to the average Vickers hardness of the particles of carbonaceous matrix material, if their amount is too low, the minimum HM value according to Embodiment 1 of 7000 MPa might not be reached. On the other hand, a powder with a too high silicon content would lead to a too low amount of carbonaceous matrix material and thus a too low "carbon from the matrix/Si" ratio. Consequently, the silicon sub-particles would be only very partially covered by the carbonaceous matrix material, which would lead to an increased SEI formation and therefore a reduced average coulombic efficiency and a reduced cycle life for the battery. Furthermore, a too high amount of silicon sub-particles could lead to a too high average Vickers hardness of the particles of carbonaceous matrix material and thus to a HM value above the maximum value according to Embodiment 1 of 20000 MPa, preferably of 18540 MPa and more preferably of 17060 MPa.

Embodiment 4

In a fourth embodiment, a composite powder for use in a negative electrode of a battery comprises the powder of any one of the Embodiments 1 to 3.

By "a composite powder for use in a negative electrode of a battery", it is meant an electrochemically active powder, comprising electrochemically active particles, that can store and release lithium ions, respectively during the lithiation and the delithiation of the negative electrode of a battery. Such a powder may equivalently be referred to as "active powder".

It has been observed by the inventors that a composite powder according to Embodiment 4, is better able to withstand the negative consequences of the presence of silicon-based sub-particles in the particles of carbonaceous matrix material, i.e. cracks in the matrix material, excessive SEI formation, reduced cycle life, those negative consequences being caused mainly by the large volume expansion of the silicon-based sub-particles during lithium incorporation. This ability is due to the presence, in the composite powder, of a powder of carbonaceous matrix material according to any one of the Embodiments 1 to 3, conferring to the particles of carbonaceous matrix material a combination of hardness and elasticity properties. Thanks to its properties of elasticity, the carbonaceous matrix material is capable of deforming under the volume expansion of the silicon-based sub-particles, while thanks to its properties of hardness, this deformation remains limited and thus ensures a limited, and somehow controlled, expansion of the negative electrode. This allows for the use of a negative electrode material with a high capacity, while keeping the impact of the volume expansion on the cycle life to an acceptable level.

Without the properties of elasticity, the carbonaceous matrix material would break under the pressure created by the volume expansion of the silicon-based sub-particles. Without the properties of hardness, the carbonaceous matrix material would expand as much as the silicon-based sub-particles do, thus leading to an unacceptable expansion of the negative electrode. In both cases, this would reduce the life of a battery to an unacceptable level.

Embodiment 5

In a fifth embodiment according to Embodiment 4, at least 70% by number of the particles of carbonaceous matrix material with silicon-based sub-particles dispersed therein, present in the composite powder, consist of particles according to Embodiment 1.

Alternatively, at least 70% by number of the particles of carbonaceous matrix material with silicon-based sub-particles dispersed therein, present in the composite powder, consist of particles according to Embodiment 2 or 3.

An example of a determination of this number-based percentage of particles is provided in the "Analytical methods" section.

Embodiment 6

In a sixth embodiment according to Embodiment 4 or 5, the composite powder further comprises crystalline carbonaceous particles, the crystalline carbonaceous particles being physically distinct from the particles of carbonaceous matrix material with silicon-based sub-particles dispersed therein.

In particular, the crystalline carbonaceous particles are not embedded in the particles of carbonaceous matrix material. This can be visually confirmed based on the analysis of one or several SEM images of cross-sections of the composite powder. The fact that the crystalline carbonaceous particles are not embedded in the particles of carbonaceous matrix material is beneficial for at least two reasons: (i) only the silicon-based sub-particles need to be covered by the matrix material, hence less matrix material having a high irreversible capacity and a low specific capacity is needed and (ii) the particles of matrix material with silicon-based sub-particles and no crystalline carbonaceous particles are smaller than if they would also comprise crystalline carbonaceous particles, which leads to less volume expansion.

There may however be some contacts between both types of particles, located at their outer surface. This is even preferable in order to ensure a good electronic conductivity of the composite powder and thus a high rate capability of a battery comprising the composite powder.

The crystalline carbonaceous particles act as a spacer between the particles of carbonaceous matrix material with silicon-based sub-particles dispersed therein, thus preventing an agglomeration of these particles of carbonaceous matrix material into an agglomerated composite powder. In the absence of such a spacer, the agglomerated composite powder, in order to be used in the negative electrode of a battery, may require a mechanical treatment, such as a grinding step, which might result in a weakening of the matrix material integrity, thus in lower Vickers hardness and elastic modulus values for the particles of carbonaceous matrix material with silicon-based sub-particles dispersed therein and eventually in a lower performance of a battery comprising such an agglomerated composite powder.

The presence of crystalline carbonaceous particles in the composite powder can for example be determined by means of an X-ray diffraction analysis. The method is described in the "Analytical methods" section.

Embodiment 7

In a seventh embodiment according to Embodiment 6, the crystalline carbonaceous particles are graphite particles.

Embodiment 8

In an eighth embodiment according to any one of the Embodiments 1 to 7, the particles of carbonaceous matrix material with silicon-based sub-particles dispersed therein, have a number-based size distribution with a $d_c50$, the $d_c50$ being larger than or equal to 1 μm, preferably larger than or equal to 5 μm and smaller than or equal to 25 μm, preferably smaller than or equal to 20 μm.

The number-based size distribution is based on a visual analysis, with or without assistance of an image analysis program, of a minimum number of particles of carbonaceous matrix material with silicon-based sub-particles dispersed therein, comprised in the powder or in the composite powder. This minimum number of particles is at least 100 particles. An example of a determination of a number-based fraction of particles is provided in the "Analytical methods" section.

For the sake of clarity, a $d_c50$ of 10 μm for example, would here mean that 50% in number of the at least 100 particles of carbonaceous matrix material with silicon-based sub-particles dispersed therein have a size smaller than 10 μm and that 50% in number of the at least 100 particles of carbonaceous matrix material with silicon-based sub-particles dispersed therein have a size larger than 10 μm.

Particles of carbonaceous matrix material with silicon-based sub-particles dispersed therein having a number-based size distribution with a $d_c50$ smaller than 1 μm, or even smaller than 5 μm, may have a too high specific surface and thus increase the surface of reaction with the electrolyte and the formation of SEI, which is disadvantageous for the reasons previously explained. Particles of carbonaceous matrix material with silicon-based sub-particles dispersed therein, having a number-based size distribution with a $d_c50$ larger than 25 μm, or even larger than 20 μm, may, due to their size, be more susceptible to suffer from the formation of fractures during the lithium uptake, thus leading to a reduced cycle life of the battery containing such particles.

Embodiment 9

In a ninth embodiment according to any one of the Embodiments 1 to 8, the silicon-based sub-particles are characterized by a number-based size distribution with a $d_{Si}50$, the $d_{Si}50$ being larger than or equal to 40 nm and smaller than or equal to 150 nm.

The number-based size distribution is based on a visual analysis, with or without assistance of an image analysis program, of a minimum number of silicon-based sub-particles comprised in the powder or the composite powder. This minimum number of silicon-based sub-particles is at least 1000 particles. An example of a determination of a number-based fraction of particles is provided in the "Analytical methods" section.

For the sake of clarity, a $d_{Si}50$ of 100 nm for example, would here mean that 50% in number of the at least 1000 silicon-based sub-particles have a size smaller than 100 nm and that 50% in number of the at least 1000 silicon-based sub-particles have a size larger than 100 nm.

Silicon-based sub-particles having a number-based size distribution with a $d_{Si}50$ lower than 40 nm are very difficult to disperse efficiently in the matrix material, which may decrease the electronic conductivity of the powder.

Silicon-based sub-particles having a number-based size distribution with a $d_{Si}50$ larger than 150 nm are more subject to fractures during their lithiation, causing a dramatic reduction of the cycle life of a battery containing such a powder.

It is considered that the $d_{Si}50$ is not affected by the process for making the powder or the composite powder, which means that the $d_{Si}50$ value of the silicon-based powder used as precursor in the process is the same as the $d_{Si}50$ value of the silicon-based sub-particles comprised in the powder and as the $d_{Si}50$ of the silicon-based sub-particles comprised in the composite powder.

Embodiment 10

In a tenth embodiment according to any one of the Embodiments 4 to 9, the composite powder has a silicon content A expressed in weight percent (wt %), wherein 10 wt % ≤ A ≤ 60 wt %.

A composite powder having a silicon content inferior to 10 wt % would have a too limited specific capacity and would therefore not allow to reach a high energy density for the battery. A composite powder having a silicon content superior to 60 wt %, would suffer too much from the volume expansion associated with this high silicon content and would therefore result in a battery having a reduced cycle life.

The composite powder also has a carbon content B expressed in weight percent (wt %), wherein 30 wt % ≤ B ≤ 88.5 wt %.

When the carbon content in the composite powder is lower than 30 wt %, the carbonaceous matrix material is not present in an amount sufficient to fully cover the silicon-based sub-particles, therefore leading to an increased electrolyte decomposition at the surface of the silicon-based sub-particles and thus to an increased SEI formation. When the carbon content in the composite powder is higher than 88.5 wt %, the specific capacity of the composite powder is too low.

Embodiment 11

In an eleventh embodiment according to any one of the Embodiments 4 to 10, the composite powder has a silicon content A and an oxygen content C, both expressed in weight percent (wt %), wherein $C \leq 0.15 \times A$.

A composite powder having a too high oxygen content would suffer from an additional irreversible consumption of lithium by the formation of lithium oxide ($Li_2O$) during the first lithiation of the powder, thus increasing the initial irreversible capacity loss of a battery containing such a composite powder.

Embodiment 12

In a twelfth embodiment according to any one of the Embodiments 1 to 11, when considering all elements except oxygen, the silicon-based sub-particles contain at least 90% by weight of Si.

The presence, in the silicon-based sub-particles, of a content superior to 10 wt % of other elements except oxygen, such as for example metal elements, would lower excessively the specific capacity of the powder and/or of the composite powder and is therefore not desired.

Embodiment 13

In a thirteenth embodiment according to any one of the Embodiments 4 to 12, the composite powder has a BET surface area which is at most 10 $m^2/g$ and preferably at most 5 $m^2/g$.

It is important for the composite powder to have a low BET specific surface area, to decrease the surface of electrochemically active particles in contact with the electrolyte, in order to limit the Solid Electrolyte Interphase (SEI) formation, which consumes lithium, and thus to limit the irreversible loss of capacity of a battery containing such a composite powder.

Embodiment 14

In a fourteenth embodiment according to any one of the Embodiments 1 to 13, the particles of carbonaceous matrix material with silicon-based particles dispersed therein are non-porous.

This is based on a visual analysis, with a Scanning Electron Microscope (SEM) preferably assisted by an image analysis program, of at least 100 cross-section(s) of particles of carbonaceous matrix material with silicon-based particles dispersed therein. If, in average, less than 1% of the area, of the at least 100 cross-sections of particles is occupied by pores (or cross-section of pores), the particles are considered to be non-porous. In other words, if the fraction of the total areas occupied by the pores (or cross-section of pores) over the total of the areas occupied by the at least 100 cross-sections of the particles of carbonaceous matrix material with silicon-based particles dispersed therein, is lower than 0.01 in average, the particles are considered to be non-porous.

Embodiment 15

In a fifteenth embodiment, the invention finally concerns a battery comprising the composite powder of any one of the Embodiments 4 to 14.

DETAILED DESCRIPTION

In the following detailed description, preferred embodiments are described in detail to enable practice of the invention. Although the invention is described with reference to these specific preferred embodiments, it will be understood that the invention is not limited to these preferred embodiments. To the contrary, the invention includes numerous alternatives, modifications and equivalents as will become apparent from considering the following detailed description.

Analytical Methods Used

Determination of the Si Content

The Si content of the powders or the composite powders in the examples and the counterexamples is measured by X-Ray Fluorescence (XRF) using an energy dispersive spectrometer. This method has an experimental random error of +/−0.3 wt % Si.

In the case where the powder of carbonaceous matrix material particles with silicon-based sub-particles dispersed therein is comprised in a composite powder, it might be difficult to measure the silicon content S of said powder by XRF. In that case, an analysis by Scanning electron microscopy with Energy Dispersive X-Ray Spectrometry (SEM-EDS) might be preferable. This allows to measure the silicon content in a given particle. An analysis of 10 particles of matrix material is sufficient to obtain an average silicon content value S of the powder.

Determination of the Oxygen Content

The oxygen content of the powders and composite powders in the examples and the counterexamples is determined by the following method, using a LECO TC600 oxygen-nitrogen analyzer. A sample of the powder to be analyzed is put in a closed tin capsule that is put itself in a nickel basket. The basket is put in a graphite crucible and heated under helium as carrier gas to above 2000° C. The sample thereby melts and oxygen reacts with the graphite from the crucible to CO or $CO_2$ gas. These gases are guided into an infrared measuring cell. The observed signal is recalculated to an oxygen content.

Determination of the Carbon Content

The carbon content of the powders and composite powders in the examples and the counterexamples is determined by the following method, using a Leco CS230 carbon-sulfur analyzer. The sample is melted in a constant oxygen flow in a ceramic crucible in a high frequency furnace. The carbon in the sample reacts with the oxygen gas and leaves the crucible as CO or $CO_2$. After conversion of an eventual presence of CO into $CO_2$, all produced $CO_2$ is finally detected by an infrared detector. The signal is finally converted into a carbon content.

Determination of the Specific Surface Area (BET)

The specific surface area is measured with the Brunauer-Emmett-Teller (BET) method using a Micromeritics Tristar 3000. 2 g of the powder to be analyzed is first dried in an oven at 120° C. for 2 hours, followed by $N_2$ purging. Then the powder is degassed in vacuum at 120° C. for 1 hour prior to the measurement, in order to remove adsorbed species.

Determination of the Electrochemical Performance

The electrochemical performance of the composite powders in the examples and the counterexamples is determined by the following method.

The powders to be evaluated are sieved using a 45 μm sieve and mixed with carbon black, carbon fibers and sodium carboxymethyl cellulose binder in water (2.5 wt %). The ratio used is 89 weight parts composite powder/1 weight part carbon black (C65)/2 weight parts carbon fibers (VGCF) and 8 weight parts carboxymethyl cellulose (CMC). These components are mixed in a Pulverisette 7 planetary ball mill for 30 minutes at 250 rpm.

A copper foil cleaned with ethanol is used as current collector. A 200 μm thick layer of the mixed components is coated on the copper foil. The coated copper foil is then dried for 45 minutes in vacuum at 70° C. A 1.27 $cm^2$ circle is punched from the dried coated copper foil and used as an electrode in a coin cell using lithium metal as counter electrode. The electrolyte is 1M $LiPF_6$ dissolved in EC/DEC 1/1+2% VC+10% FEC solvents.

All coin-cells are cycled using a high precision battery tester (Maccor 4000 series) using the procedure described below, where "CC" stands for "constant current" and "CV" stands for "constant voltage".

Cycle 1:
      Rest 6 h
      CC lithiation to 10 mV at C/10, then CV lithiation until
        C/100
      Rest 5 min
      CC delithiation to 1.5 V at C/10
      Rest 5 min
    From cycle 2 on:
      CC lithiation to 10 mV at C/2, then CV lithiation until
        C/50
      Rest 5 min
      CC delithiation to 1.2 V at C/2
      Rest 5 min The coulombic efficiency (CE) of the coin-cell, being the ratio of the capacity at delithiation to the capacity at lithiation at a given cycle, is calculated for the initial cycle as well as for the subsequent ones. The initial cycle is the most important one in terms of coulombic efficiency, since the reaction of SEI formation has a huge impact on the CE. Typically for a silicon-based powder the coulombic efficiency at the initial cycle can be as low as 80% (or even lower), corresponding to an irreversible capacity loss for the coin-cell of 20%, which is huge. The target is to reach at least 90% CE at the initial cycle.

For the subsequent cycles even though the CE usually increases well over 99%, the skilled person will be aware that even a small difference in coulombic efficiency per cycle, will have, over the hundreds or thousands of charging-discharging cycles a battery is expected to last, a significant cumulative effect. To give an example, a cell with an initial capacity of 1 Ah having an average CE of 99.8% will, after 100 charging-discharging cycles, have a remaining capacity of 0.8 Ah, which is 60% higher than for a cell having an average CE of 99.5% (remaining capacity of 0.5 Ah).

The target in terms of average CE from cycle 5 to cycle 50 is to reach at least 99.6%, preferably at least 99.65% for a cell comprising a composite powder with a specific capacity of 800±20 mAh/g.

Determination of the Number-Based Particle Size Distribution

The number-based particle size distribution of the particles of carbonaceous matrix material and/or of the silicon-based sub-particles particles is determined via an electron microscopy analysis (SEM or TEM) of a cross-section of the powder (or the composite powder), combined with an image analysis.

To do this, a cross-section of the powder (or the composite powder), comprising multiple cross-sections of particles of carbonaceous matrix material, each of them comprising multiple cross-sections of silicon-based sub-particles, is prepared following the procedure detailed hereunder.

500 mg of the powder (or composite powder) to be analyzed is embedded in 7 g of a resin (Buehler EpoxiCure 2) consisting of a mix of 4 parts Epoxy Resin (20-3430-128) and 1 part Epoxy Hardener (20-3432-032). The resulting sample of 1" diameter is dried during at least 8 hours. It is then polished, first mechanically using a Struers Tegramin-30 until a thickness of maximum 5 mm is reached, and then further polished by ion-beam polishing (Cross Section Polisher Jeol SM-09010) for about 6 hours at 6 kV, to obtain a polished surface. A carbon coating is finally applied on this polished surface by carbon sputtering using a Cressington 208 carbon coater for 12 seconds, to obtain the sample, also called "cross-section", that will be analyzed by SEM.

The prepared cross-section is then analyzed using a FEG-SEM JSM-7600F from JEOL equipped with an EDS detector Xflash 5030-127 from Bruker (30 mm$^2$, 127 eV). The signals from this detector are treated by the Quantax 800 EDS system from Bruker.

The enlargements are generated by applying a voltage of 15 kV at a working distance of several millimeters. The images from the backscattered electrons are reported when adding value to the images from the optical microscope.

The size of a particle of carbonaceous matrix material (or of a silicon-based sub-particle) is considered to be equivalent to the maximum straight-line distance between two points on the perimeter of a discrete cross-section of that particle of carbonaceous matrix material (or of a silicon-based sub-particle).

For the purpose of illustrating, in a non-limitative way, the determination of the number-based particle size distribution of particles of carbonaceous matrix material (or of silicon-based sub-particles), a SEM-based procedure is provided below.

1. Multiple SEM images of the cross-section of the powder (or the composite powder) comprising the particles of carbonaceous matrix material with silicon-based sub-particles dispersed therein, are acquired.

2. The contrast and brightness settings of the images are adjusted for an easy visualization of the cross-sections of the particles of carbonaceous matrix material and the silicon-based sub-particles. Due to their different chemical composition, the difference in brightness allows for an easy distinction between the particles and the sub-particles.

3. At least 1000 discrete cross-sections of silicon-based sub-particles and at least 100 discrete cross-sections of particles of carbonaceous matrix material, not overlapping, respectively, with another cross-section of a silicon-based sub-particle or another cross-section of a particle of carbonaceous matrix material, are selected from one or several of the acquired SEM image(s), using a suitable image analysis software. These discrete cross-sections of silicon-based sub-particles or of particles of carbonaceous matrix material can be selected from one or more cross-sections of the powder (or the composite powder) comprising the particles of carbonaceous matrix material and the silicon-based sub-particles.

4. The size of the discrete cross-sections of the silicon-based sub-particles and of the discrete cross-sections of particles of carbonaceous matrix material, are measured using a suitable image analysis software for each of the at least 1000 discrete cross-sections of silicon-based sub-particles and at least 100 discrete cross-sections of particles of carbonaceous matrix material.

The $d_{Si}10$, $d_{Si}50$ and $d_{Si}90$ values, as well as the $d_C10$, $d_C50$ and $d_C90$ values of, respectively, the number-based particle size distribution of silicon-based sub-particles and of the number-based particle size distribution of particles of carbonaceous matrix material, determined using the method described above, are then calculated. These number-based particle size distributions can be readily converted to a weight- or a volume-based particle size distribution via well-known mathematical equations.

Determination of the Presence of Pores in the Particles of Carbonaceous Matrix Material The same method of electron microscopy analysis of a cross-section of the powder (or the composite powder) is used. For each of the at least 100 discrete cross-sections of particles of carbonaceous matrix material, the fraction of the total area occupied by pores (or cross-sections of pores) over the total area occupied by the particle(s) (or cross-section of particle(s)) is determined using a suitable image analysis software and the average value of these fractions is calculated. As mentioned earlier, if the average value of these fractions is lower than 0.01, the particles are considered to be non-porous.

Determination of the Presence of Crystalline Carbonaceous Particles in the Composite Powder The determination of the presence of crystalline carbonaceous particles in the composite powder is done, performing an X-ray diffraction (XRD) analysis of the composite powder. The following method is used.

XRD measurements are performed on a Panalytical 'X Pert Pro system with CuKα1 and CuKα2 radiation, λ=0.15418 nm, with a step size of 0.017° 2θ, scan rate of 34 minutes (2064 seconds) and measuring from 5° to 90° 2θ on a flattened surface of about 2 cm$^3$ powder material at least, using the ICDD database, PDF-4+, for the identification of present compounds. The XRD peak having a maximum at $2\theta_{Cu}$ between 26° and 27° corresponds to the (002) reflection of graphitic carbon, which results from diffraction of X-rays from inter-plane graphene layers. The background is first subtracted from the raw XRD data. The $2\theta_{Cu}$ values at half maximum intensity on the left side and the right side of the C(002) peak are then determined. The Full Width at Half Maximum (FWHM) value is the difference between these two $2\theta_{Cu}$ values. The FWHM value is normally determined using the program provided with the X-Ray diffractometer. A manual calculation may be used as well. If the calculated FWHM value is inferior or equal to 0.5°2θ, the presence of crystalline carbonaceous particles in the composite powder is confirmed.

Determination of the Vickers Hardness and Elasticity Modulus by Nanoindentation

The Vickers hardness values and elastic modulus values of the particles of carbonaceous matrix material with silicon-based sub-particles dispersed therein, comprised in the powders and composite powders are determined using a Nanoindentation Tester NHT[3] with the following test conditions and parameters:

Test atmosphere: Air
Temperature: 22° C.
Humidity: 40%
Indenter Type: Berkovich
Loading Type: Linear
Maximum Load: 5 [mN]
Pause at Max Load: 10 [s]
Loading/Unloading Rate: 30 [mN/min]

The number of indents performed on each particle of carbonaceous matrix material with silicon-based sub-particles embedded therein, varies depending on their size: for small particles, having a size below 20 μm, only one indent per particle is performed, whereas for particles which are large enough, a matrix of various indents was performed. For example, matrices of 4×4, 4×5 or 6×6 indents are performed on the particles for which it is possible. The distance between the indents is set to 10 μm. All the results are obtained using the Oliver & Pharr method with supposed sample ratio of 0.3 for elastic modulus calculation.

The procedure comprises the following steps:

1. The powder (or composite powder) to be analyzed is first embedded in a resin to obtain a sample, the surface of said sample further being polished to obtain a sample with a polished surface, following the method described earlier.

2. The obtained sample with a polished surface is then analyzed by nanoindentation; several areas comprising particles are visualized. In each of them, the contrast and brightness settings are adjusted for an easy visualization of the particles of carbonaceous matrix material with silicon-based sub-particles dispersed therein. Due to their different chemical composition, the difference in brightness allows for an easy distinction between the particles of matrix material comprising or not silicon-based sub-particles.

3. Depending on the size of the particles, one or several indents are performed on several particles of carbonaceous matrix material with silicon-based sub-particles dispersed therein.

4. In total, at least 100 indents are performed on at least 10 different particles of carbonaceous matrix material with silicon-based sub-particles dispersed therein.

5. For each indent, the Vickers hardness value and elastic modulus value are determined, then the average Vickers hardness value and the average elastic modulus value of each of the at least 10 different particles, are calculated.

6. Finally, the harmonic mean value HM is calculated according to the following formula:

$$HM = \frac{2 \times H \times E}{H + E}$$

wherein H is the average Vickers hardness value of the at least 10 different particles of carbonaceous matrix material with silicon-based sub-particles dispersed therein comprised in the powder (or the composite powder) and E is the average elastic modulus value of the at least 10 different particles of carbonaceous matrix material with silicon-based sub-particles dispersed therein comprised in the powder (or the composite powder).

Further, the number-based percentage of particles of carbonaceous matrix material with silicon-based sub-particles dispersed therein, consisting of particles according to Embodiment 1 can be calculated. As an illustration, we take a composite powder for which the results obtained by nanoidentation are presented in Table 1:

TABLE 1

| Particle number | Number of indents | Average Vickers hardness (MPa) | Average elastic modulus (10³ MPa) | Harmonic mean (MPa) |
|---|---|---|---|---|
| 1 | 1 | 4850 | 27.3 | 8237 |
| 2 | 20 | 5150 | 28.3 | 8714 |
| 3 | 1 | 3810 | 30.1 | 6764 |
| 4 | 1 | 5020 | 26.3 | 8431 |
| 5 | 16 | 4980 | 27.1 | 8414 |
| 6 | 36 | 5030 | 28.3 | 8542 |
| 7 | 1 | 5060 | 28.0 | 8571 |
| 8 | 1 | 5110 | 27.4 | 8614 |
| 9 | 1 | 5090 | 27.8 | 8605 |
| 10 | 30 | 5050 | 27.6 | 8538 |
| Average values | | 4915 (=H) | 28.0 (=E) | |

In that case, the average Vickers hardness value H is equal to 4915 MPa and the average elastic modulus value E is equal to 28.0×10³ MPa, resulting in a mean harmonic value HM of 8354 MPa. Only 1 out of 10 particles (particle number 3) does not have a harmonic mean superior or equal to 7000 MPa and inferior or equal to 20000 MPa, therefore the number-based percentage of particles of carbonaceous matrix material with silicon-based sub-particles dispersed therein, present in this illustrative composite powder, and consisting of particles according to embodiment 1, is equal to 90%.

Experimental Preparation of Counter Examples and Examples

Example 1 (E1), According to the Invention

To produce the powder of Example 1, a silicon-based powder is first obtained by applying a 60 kW radio frequency (RF) inductively coupled plasma (ICP), using argon as plasma gas, to which a micron-sized silicon powder precursor is injected at a rate of circa 45 g/h, resulting in a prevalent (i.e. in the reaction zone) temperature above 2000K. In this first process step, the precursor becomes totally vaporized. In a second process step, an argon flow of 17 Nm³/h is used as quench gas immediately downstream of the reaction zone in order to lower the temperature of the gas below 1600K, causing a nucleation into metallic submicron silicon powder. Finally, a passivation step is performed at a temperature of 100° C. during 5 minutes by adding 100 l/h of a N₂/O₂ mixture containing 1 mole % oxygen.

The specific surface area (BET) of the obtained silicon powder is measured to be 89 m²/g. The oxygen content of the obtained silicon powder is measured to be 8.4 wt %. The number-based particle size distribution of the silicon powder is determined to be: $d_{Si}10=54$ nm, $d_{Si}50=106$ nm and $d_{Si}90=175$ nm.

Then, a dry blend is made of 100 g of the obtained silicon-based powder and 308 g of a petroleum-based pitch powder having a softening point of 230° C. The blend is fed under a nitrogen flow at a feed rate of 1000 g/h into a twin-screw extruder, operated at a temperature of 300° C.

The mixture of the silicon-based powder in pitch thus obtained is cooled to room temperature and, once solidified, pulverized and sieved on a 400-mesh sieve, to produce an intermediate powder.

20 g of the intermediate powder are then put in a quartz crucible in a tube furnace, heated up at a heating rate of 3° C./min to 1020° C., kept at that temperature for two hours and then cooled. All this is performed under argon atmosphere.

The fired product is finally ball-milled with alumina balls for 1 hour at 300 rpm and sieved over a 325-mesh sieve, to obtain the powder of Example 1.

The key synthesis parameters are summarized in Table 2.

The total Si content in this powder is measured to be 30.4 wt % by XRF, having an experimental error of +/−0.3 wt %. This corresponds to a calculated value based on a weight loss of the pitch upon heating of circa 35 wt % and an insignificant weight loss upon heating of the other components. The calculated ratio of carbon content resulting from the carbonization of the pitch over the silicon content in the powder is around 2. The oxygen content of this powder is measured to be 3.0 wt %. The specific surface area (BET) of the obtained powder is measured to be 3.5 $m^2$/g. The number-based $d_C50$ value of the particles of carbonaceous matrix material with silicon-based sub-particles dispersed therein is equal to 18.4 μm.

The nanoidentation analysis performed on 12 particles of carbonaceous matrix material with silicon-based sub-particles dispersed therein, corresponding to a total of 114 indents, results in an average Vickers hardness value H of 5250 MPa and an average elastic modulus value E of 38.5×10³ MPa, which corresponds to a HM value of 9240 MPa. The number-based percentage of particles of carbonaceous matrix material with silicon-based sub-particles dispersed therein, analyzed in the powder of Example 1, and having a harmonic mean value superior or equal to 7000 MPa and inferior or equal to 20000 MPa is 100%.

The average fraction of the total area occupied by pores (or cross-sections of pores) over the total area occupied by the particle(s) (or cross-section of particle(s)), observed by SEM analysis, using a suitable image analysis software is equal to 0.002 (0.2%).

These values are reported in Table 3.

Example 2 (E2), According to the Invention

To produce the composite powder of Example 2 (E2), 20 g of the intermediate powder obtained in Example 1 are mixed with 12.5 g of graphite, for 3 hours on a roller bench, after which the obtained mixture is passed through a mill to de-agglomerate it. At these conditions good mixing is obtained but the graphite particles do not become embedded in the pitch.

A thermal after-treatment is further given to the obtained mixture of the intermediate powder and the graphite as follows: the product is put in a quartz crucible in a tube furnace, heated up at a heating rate of 3° C./min to 1020° C., kept at that temperature for two hours and then cooled. All this is performed under argon atmosphere.

The fired product is finally manually crushed in a mortar and sieved over a 325-mesh sieve to form a final powder.

The total Si content in this composite powder is measured to be 18.6 wt % by XRF. The oxygen content of this powder is measured to be 1.8 wt %. The specific surface area (BET) of the obtained powder is measured to be 3.9 $m^2$/g. The number-based $d_C50$ value of the particles of carbonaceous matrix material with silicon-based sub-particles dispersed therein is equal to 16.6 μm.

Additional physical properties are reported in Table 3.

Examples 3 (E3), According to the Invention

To produce the composite powder of Example 3 (E3), the same procedure as for the composite powder of Example 2 is used, except that the thermal after-treatment is performed at a temperature of 950° C., instead of 1020° C.

The total Si content in this composite powder is measured to be 18.5 wt % by XRF. The oxygen content of this powder is measured to be 1.8 wt %. The specific surface area (BET) of the obtained powder is measured to be 4.2 $m^2$/g. The number-based $d_C50$ value of the particles of carbonaceous matrix material with silicon-based sub-particles dispersed therein is equal to 16.4 μm.

Additional physical properties are reported in Table 3.

Examples 4 (E4), According to the Invention

To produce the composite powder of Example 4 (E4), a new intermediate powder is prepared, as in the Example 1, except that 100 g of the same silicon-based powder are blended with 230 g (instead of 308 g) of the same pitch powder.

The composite powder of Example 4 is then prepared following the same procedure as for the composite powder of Example 2, except that 20 g of the new intermediate powder are mixed with 20 g of graphite (instead of 12.5 g). The ratio of carbon content resulting from the carbonization of the pitch over the silicon content in the composite powder E4 is around 1.5.

The total Si content in this composite powder is measured to be 18.3 wt % by XRF. The oxygen content of this powder is measured to be 1.9 wt %. The specific surface area (BET) of the obtained powder is measured to be 4.0 $m^2$/g. The number-based $d_C50$ value of the particles of carbonaceous matrix material with silicon-based sub-particles dispersed therein is equal to 16.6 μm.

Additional physical properties are reported in Table 3.

Examples 5 (E5), According to the Invention

To produce the composite powder of Example 5 (E5), a new intermediate powder is prepared, as in the Example 1, except that the pitch powder used has a softening point of 270° C. (instead of 230° C.).

The composite powder of Example 5 is then prepared following the same procedure as for the composite powder of Example 2.

The total Si content in this composite powder is measured to be 18.4 wt % by XRF. The oxygen content of this powder is measured to be 1.8 wt %. The specific surface area (BET) of the obtained powder is measured to be 3.8 $m^2$/g. The number-based $d_C50$ value of the particles of carbonaceous matrix material with silicon-based sub-particles dispersed therein is equal to 16.7 μm.

Additional physical properties are reported in Table 3.

Counter Example 1, not According to the Invention

To produce the composite powder of Counter example 1 (CE1), a new intermediate powder is prepared, as in the Example 1, except that the carbon precursor used is lignin, instead of petroleum-based pitch. The carbon yield of lignin (~50%) being inferior to the one of pitch (~65%), 100 g of the same silicon-based powder are blended with 400 g of lignin (instead of 308 g of pitch).

The composite powder of Counter example 1 is then prepared following the same procedure as for the composite powder of Example 2.

The total Si content in this composite powder is measured to be 18.6 wt % by XRF. The oxygen content of this powder is measured to be 1.9 wt %. The specific surface area (BET) of the obtained powder is measured to be 3.2 m²/g. The number-based $d_C50$ value of the particles of carbonaceous matrix material with silicon-based sub-particles dispersed therein is equal to 20.1 µm.

Additional physical properties are reported in Table 3.

Counter Example 2 (CE2), not According to the Invention

To produce the composite powder of Counter example 2 (CE2), the same procedure as for the composite powder of Example 2 is used, except that the thermal after-treatment is performed at a temperature of 800° C., instead of 1020° C.

The total Si content in this composite powder is measured to be 18.4 wt % by XRF. The oxygen content of this powder Table 2: Summary of the Synthesis Parameters of the Powders E1-E5 and CE1-CE3

TABLE 2

| Example # | Carbon precursor | Presence of crystalline carbon | Heat treatment temperature (° C.) | Ratio C from precursor/Si |
|---|---|---|---|---|
| E1 | Pitch - 230° C. | No | 1020 | 2 |
| E2 | Pitch - 230° C. | Yes | 1020 | 2 |
| E3 | Pitch - 230° C. | Yes | 950 | 2 |
| E4 | Pitch - 230° C. | Yes | 1020 | 1.5 |
| E5 | Pitch - 270° C. | Yes | 1020 | 2 |
| CE1 | Lignin | Yes | 1020 | 2 |
| CE2 | Pitch - 230° C. | Yes | 800 | 2 |
| CE3 | Pitch - 290° C. | Yes | 1000 | 1.2 |

Table 3: Physical Properties of the Powders E1-E5 and CE1-CE3

TABLE 3

| Example # | Nanoindentation properties | | | | Fraction of |
|---|---|---|---|---|---|
| | Average Vickers Hardness H (MPa) | Average elastic modulus E (10³ MPa) | Harmonic mean HM (MPa) | % of particles with 7000 < HM < 20000 MPa | surface occupied by pores vs. surface of particles |
| E1 | 5250 | 38.5 | 9240 | 100 | 0.001 |
| E2 | 6430 | 40.1 | 11083 | 100 | 0 |
| E3 | 4860 | 29.2 | 8333 | 90 | 0.001 |
| E4 | 8230 | 35.1 | 13334 | 100 | 0 |
| E5 | 9490 | 56.1 | 16234 | 100 | 0 |
| CE1 | 3760 | 27.9 | 6627 | 10 | 0.025 |
| CE2 | 3120 | 22.9 | 5492 | 10 | 0.001 |
| CE3 | 12950 | 52.2 | 20752 | 40 | 0 | is measured to be 2.0 wt %. The specific surface area (BET) of the obtained powder is measured to be 2.8 m²/g. The number-based $d_C50$ value of the particles of carbonaceous matrix material with silicon-based sub-particles dispersed therein is equal to 25.2 µm.

Additional physical properties are reported in Table 3.

Counter Example 3 (CE3), not According to the Invention

To produce the composite powder of Counter example 3 (CE3), the same procedure as for Counter example 1 (CE1) disclosed in the International Patent Application WO 2019/137797 A1, is used. It is to be mentioned that the pitch powder used has a softening point of 290° C.

The total Si content in this composite powder is measured to be 14.7 wt % by XRF. The oxygen content of this powder is measured to be 1.8 wt %. The specific surface area (BET) of the obtained powder is measured to be 3.5 m²/g. The number-based $d_C50$ value of the particles of carbonaceous matrix material with silicon-based sub-particles dispersed therein is equal to 14.2 µm.

Additional physical properties are reported in Table 3.

It can be observed from Table 2 and Table 3 that there are mainly 2 parameters having a strong influence on the HM value. Firstly, the carbon source, for which a comparison between powders E2 and E5 shows an increase of the HM value with an increase of the softening point of the pitch material. This is probably due to the fact that a pitch material with a high softening point comprises larger molecules than a pitch material with a low softening point, which will, even after firing, lead to a higher average Vickers hardness of the particles of carbonaceous matrix material. A comparison between powders E2 and CE1 also illustrates the effect of the type of carbon source, in that case lignin vs. pitch, on the HM value.

Secondly, the ratio "carbon from precursor/Si", for which a comparison between powders E2 and E4 shows an increase of the HM value with a decrease of said ratio. As already mentioned earlier, the silicon sub-particles having a significant contribution to the average Vickers hardness of the particles of carbonaceous matrix material, when the ratio "carbon from precursor/Si" decreases, the contribution of the silicon sub-particles increases, and the average Vickers hardness increases too. Similarly, the presence of a higher concentration of silicon sub-particles leads to a higher density of the particles of carbonaceous matrix material comprising those latter and therefore to a higher average Vickers hardness and to a higher HM value.

Electrochemical Evaluation of the Powders

The produced powders and composite powders are tested in coin-cells according to the procedure specified above. All powders and composite powders tested have a specific capacity of 800 mAh/g±20 mAh/g, except the powder of Counter example 3, which has a specific capacity of 734 mAh/g and the powder of Example 1, which has a specific capacity of 1080 mAh/g. Therefore, the powder of Example 1 is mixed with graphite during the electrode preparation, to achieve a capacity of the mixture "powder+graphite" of ~800 mAh/g. The results obtained for the average coulombic efficiency between cycle 5 and cycle 50 are given in Table 4. Comparing the results of the powders and composite powders from E1 to E5—according to the invention—with the composite powders from CE1 and CE2, it can be seen in E1-E5 that there is an increase in the average coulombic efficiency with the HM value, for the possible reasons that have been previously given. However, when the HM value is larger than 17060 MPa, more so when it is larger than 18540 MPa and even more so when it is larger than 20000 MPa, as it is the case for the composite powder of CE3, the average coulombic efficiency appears to decrease dramatically. This is probably due principally to the high average Vickers hardness of the particles of carbonaceous matrix material with silicon-based sub-particles dispersed therein, being larger than 12000 MPa, thus leading to fractures or cracks in the carbonaceous matrix during the large volume expansion of the silicon-based sub-particles during lithium incorporation, thereby leading to an excessive SEI formation and to a reduced average coulombic efficiency value for the battery.

Table 4: Performance of Coin-Cells Containing Powders and Composite Powders E1-E5 and CE1-CE3

TABLE 4

| Example # | Average coulombic efficiency cycles 5-50 (%) |
|---|---|
| E1 | 99.64 |
| E2 | 99.68 |
| E3 | 99.62 |
| E4 | 99.75 |
| E5 | 99.80 |
| CE1 | 99.57 |
| CE2 | 99.54 |
| CE3 | 99.50 |

The invention claimed is:

1. A powder of carbonaceous matrix material particles, said particles comprising silicon-based sub-particles dispersed therein, said particles having a harmonic mean value HM calculated according to the formula (1), $$HM = \frac{2 \times H \times E}{H + E} \quad (1)$$

wherein H is the average Vickers hardness value of the particles of carbonaceous matrix material and E is the average elastic modulus value of the particles of carbonaceous matrix material, both values H and E being measured by nanoindentation and expressed in MPa, said powder being characterized in that HM is superior or equal to 7000 MPa and inferior or equal to 20000 MPa.

2. The powder of claim 1, wherein said particles of carbonaceous matrix material have an average Vickers hardness value H of at least 4000 MPa and at most 12000 MPa and an average elastic modulus value E of at least $28 \times 10^3$ MPa and at most $60 \times 10^3$ MPa.

3. The powder of claim 1, having a silicon content S expressed in weight percent (wt %), wherein 20 wt %≤S≤70 wt %.

4. A composite powder for use in a negative electrode of a battery, said composite powder comprising the powder of claim 1.

5. The composite powder of claim 4, wherein at least 70% by number of the particles of carbonaceous matrix material with silicon-based sub-particles dispersed therein, present in said composite powder, comprise particles having a harmonic mean value HM calculated according to the formula (1), $$HM = \frac{2 \times H \times E}{H + E} \quad (1)$$

wherein H is the average Vickers hardness value of the particles of carbonaceous matrix material and E is the average elastic modulus value of the particles of carbonaceous matrix material, both values H and E being measured by nanoindentation and expressed in MPa, said powder being characterized in that HM is superior or equal to 7000 MPa and inferior or equal to 20000 MPa.

6. The composite powder of claim 4, further comprising crystalline carbonaceous particles, the crystalline carbonaceous particles being physically distinct from the particles of carbonaceous matrix material with silicon-based sub-particles dispersed therein.

7. The composite powder of claim 6, wherein the crystalline carbonaceous particles are graphite particles.

8. The powder of claim 1, wherein the particles of carbonaceous matrix material with silicon-based sub-particles dispersed therein have a number-based size distribution with a $d_C50$, the $d_C50$ being larger than or equal to 1 μm and smaller than or equal to 25 μm.

9. The composite powder of claim 4, wherein the silicon-based sub-particles have a number-based size distribution with a $d_{Si}50$, the $d_{Si}50$ being larger than or equal to 40 nm and smaller than or equal to 150 nm.

10. The composite powder of claim 4, having a silicon content A expressed in weight percent (wt %), wherein 10 wt %≤A≤60 wt %.

11. The composite powder of claim 4, having a silicon content A and an oxygen content C, both expressed in weight percent (wt %), wherein C≤0.15×A.

12. The composite powder of claim 4, wherein when considering all elements except oxygen, the silicon-based sub-particles contain at least 90% by weight of silicon.

13. The composite powder of claim 4, having a BET surface area which is at most 10 m²/g.

14. The composite powder of claim 4, wherein the particles of carbonaceous matrix material with silicon-based particles dispersed therein are non-porous.

15. A battery comprising the composite powder according to claim 4.

16. The composite powder of claim 4, wherein the particles of carbonaceous matrix material with silicon-based sub-particles dispersed therein have a number-based size distribution with a $d_C50$, the $d_C50$ being larger than or equal to 1 μm and smaller than or equal to 25 μm.

* * * * *